(12) United States Patent
Choi (10) Patent No.: US 8,558,849 B2
(45) Date of Patent: Oct. 15, 2013

(54) METHOD AND APPARATUS FOR PROCESSING A USER INTERFACE IN AN IMAGE PROCESSOR

(75) Inventor: Hong-jun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 12/755,460

(22) Filed: Apr. 7, 2010

(65) Prior Publication Data

US 2011/0141128 A1    Jun. 16, 2011

(30) Foreign Application Priority Data

Dec. 14, 2009   (KR) .................. 10-2009-0124006

(51) Int. Cl.
*G09G 5/00* (2006.01)
(52) U.S. Cl.
USPC ........... 345/642; 345/582; 345/619; 345/622; 345/172; 345/173; 715/764; 715/767; 715/769; 715/821; 715/823; 715/835
(58) Field of Classification Search
None
See application file for complete search history.

(56) References Cited

U.S. PATENT DOCUMENTS

| | | | | |
|---|---|---|---|---|
| 7,631,253 B2 * | 12/2009 | Hertzfeld et al. | ............. | 715/201 |
| 2010/0299641 A1 * | 11/2010 | Cundill | ......................... | 715/863 |
| 2010/0331047 A1 * | 12/2010 | Bilcu et al. | .................... | 455/557 |

* cited by examiner

*Primary Examiner* — Antonio A Caschera
(74) *Attorney, Agent, or Firm* — Sughrue Mion, PLLC (57) ABSTRACT

A method and apparatus for processing a user interface in an image processor. In the method, at least one Region of Interest (ROI) is set on an image displayed on a screen. Location information of a renewed ROI and an image processing result based on to a location of the corresponding ROI are outputted whenever the location of the at least one ROI is renewed. An image of the at least one ROI is stored according to the image processing result. In the apparatus, a control unit extracts ROI information when the ROI is set on an image displayed on a screen, and displays location information of a renewed ROI whenever the location information of the ROI is renewed. An image signal processing unit converts the location information of the ROI extracted from the control unit into graphical data and performs image signal processing on the image of the ROI.

12 Claims, 6 Drawing Sheets

METHOD AND APPARATUS FOR PROCESSING A USER INTERFACE IN AN IMAGE PROCESSOR

CROSS-REFERENCE TO RELATED PATENT APPLICATION

This application claims the benefit of Korean Patent Application No. 10-2009-0124006, filed on Dec. 14, 2009, in the Korean Intellectual Property Office, the disclosure of which is incorporated herein in its entirety by reference.

BACKGROUND

1. Field

The exemplary embodiments relate to a user interface of an image processor, and more particularly, to a method and an apparatus for processing a user interface in an image processor, providing an efficient designation of a region of interest in an image processor.

2. Description of the Related Art

Touch-based image processing devices such as mobile phones, smart phones, PDAs, PMPs, digital cameras, and camcorders are widely distributed.

Such image processing devices output images on a screen using memories and codecs, and provide a user interface function of storing an image of a Region of Interest (ROI) on the screen.

However, it is inconvenient in a conventional image processing device, when a processing result of an ROI is unsatisfactory after the ROI is designated, that a new ROI has to be designated by cancelling the previous ROI using a cancellation command (e.g., undo command).

Accordingly, it is important to provide user interface processing for efficiently providing designation of an ROI in an image processing device.

SUMMARY

The exemplary embodiments provide a method and an apparatus for processing a user interface in an image processor, designating a Region of Interest (ROI) using only a location input in an image processor.

According to an aspect of the exemplary embodiments, there is provided a method of processing a user interface in an image processor, including: setting at least one Region of Interest (ROI) on an image displayed on a screen; outputting location information of a renewed ROI and an image processing result based on a location of the corresponding ROI whenever the location of the at least one ROI is renewed; and storing an image of the at least one ROI according to the image processing result.

The renewal of the at least one ROI may include adding a location of an ROI by a single touch on a screen and deleting the location of the ROI by performing a double touch or an additional single touch for the location of the designated ROI on the screen.

The outputting of the location information of the at least one ROI may include storing a location of an ROI whenever the location of the ROI is added or deleted and displaying the location of the ROI on the screen in the form of a certain image whenever the location of the stored ROI is renewed.

The location of the ROI may be an image processing region having a certain radius around a touch point of the image processor.

The location of the at least one ROI may be stored in a First In First Out (FIFO) type buffer array.

The outputting of the image processing result may include performing image quality improvement processing on images of the at least one renewed ROI, as a group, to display the image quality-improved images on the screen.

The storing of the image of the ROI may include storing images when a command for storing the images of the ROI displayed on the screen is received and designating a new ROI when the command for storing the images of the ROI displayed on the screen is not received.

The method may include: displaying an original image on a screen; displaying a location of an ROI and an image of an image processing result whenever the location of the ROI is set on the displayed image; and storing the image according to the image processing result.

The location of the ROI may be stored in a FIFO type buffer array.

The displaying of the location of the ROI and the image processing result may include displaying an On Screen Display (OSD) information based on the location of the ROI and performing image quality improvement processing for the image at the location of the ROI, to display the image on the screen.

The storing of the image may include storing images when a command for storing the image quality improved images displayed on the screen is received, and setting a new image of the ROI when the command for storing the image quality improved images displayed on the screen is not received.

According to another aspect of the exemplary embodiments, there is provided a user interface processor in an image processing system including: a control unit extracting location information of an ROI when the ROI is set on an image displayed on a screen, and displaying location information of a renewed ROI and an image based on a location of the corresponding ROI whenever the location information of the ROI is renewed; and an image signal processing unit converting the location information of the ROI extracted from the control unit into graphic data and performing image signal processing on the image of the ROI.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION

The exemplary embodiments will now be described more fully with reference to the accompanying drawings, in which exemplary embodiments of the invention are shown.

Figure 1:
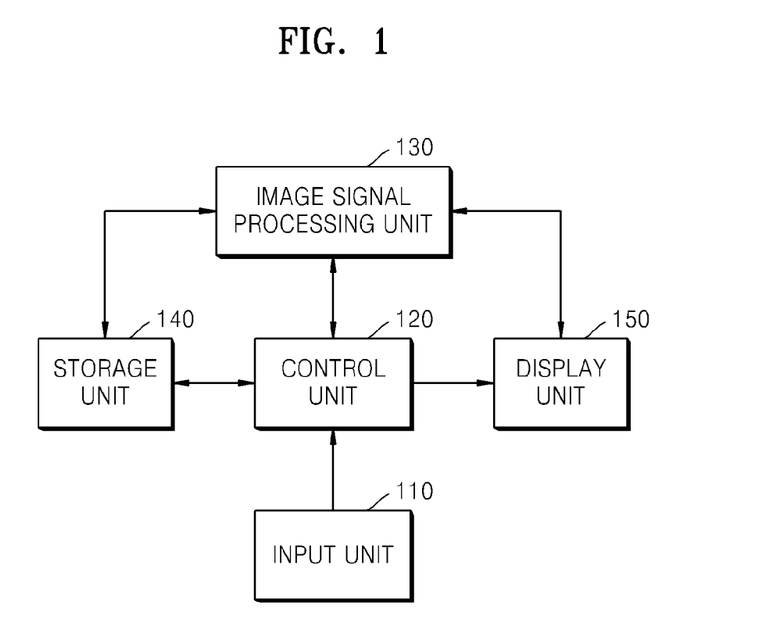
FIG. 1 is a block diagram illustrating an image processor according to an exemplary embodiment.

FIG. 1 is a block diagram illustrating an image processor according to an exemplary embodiment.

The image processor of FIG. 1 may include an input unit 110, a control unit 120, an image signal processing unit 130, a storage unit 140, and a display unit 150.

The input unit 110 may generate an input signal for designating a Region of Interest (ROI) of a user.

Also, the input unit 110 may convert an ROI designated by a user into a coordinate value of block or pixel unit. The input unit 110 may use a touch screen, but is not limited thereto.

The control unit 120 may include a Micro Processing Unit (MPU) or an integrated circuit integrated with a plurality of circuits for realizing a control function.

The control unit 120 may detect coordinates of a block unit or a pixel unit that are inputted through the input unit 110 to form a User Interface (UI) screen of a certain type at the location of the ROI. For example, when the input unit 110 and the display unit 150 based on a touch screen are used, the control unit 120 may detect a touch by a user to generate a circular UI screen, using on a sensor responding to pressure applied to the touch screen. In this case, a method of detecting a touch on the touch screen may be a well-known method using a pressure type or an electrostatic capacity type.

Also, when an ROI is designated on an image displayed on the display unit 150, the control unit 120 may extract location information of the designated ROI to store the location information in the storage unit 140, and may display the location information of an renewed ROI and an image based on the location of the corresponding ROI on a screen whenever the location information of the ROI stored in the storage unit 140 is renewed. Also, when an image storage command is received through the input unit 110, the control unit 120 may store the images of the corresponding ROI.

The image signal processing unit 130 may convert the location information of the ROI extracted from the control unit 120 into graphic data, and may perform an image quality improvement processing by applying an image quality improvement algorithm to the images corresponding to the location of the extracted ROI. Also, the signal processing in the image signal processing unit 130 may be realized by hardware (e.g., signal processing circuit) and/or software (signal processing software).

The storage unit 140 may store the images of the ROI processed in the image signal processing unit 130 and data manipulated by a user, and store a program for driving the control unit 120 or control data. Particularly, the storage unit 140 may include a buffer array in which the location information of the ROI is to be stored. In this case, the buffer array may use and release data in a First In First Out (FIFO) order, but is not limited thereto. Here, examples of the storage unit 140 may include magnetic recording media such as hard disks or non-volatile memories such as EEPROMs or flash memories, but is not limited thereto.

The display unit 150 may display the images signal-processed by image signal processing unit 130, and display various control commands generated by the control unit 120, using graphics. The display unit 150 may use a touch screen, but is not limited thereto.

Accordingly, an image processor according to an embodiment may display the location of an ROI and an image processing result of the ROI before a user issues a save command, whenever the location of the ROI is designated.

Figure 2:
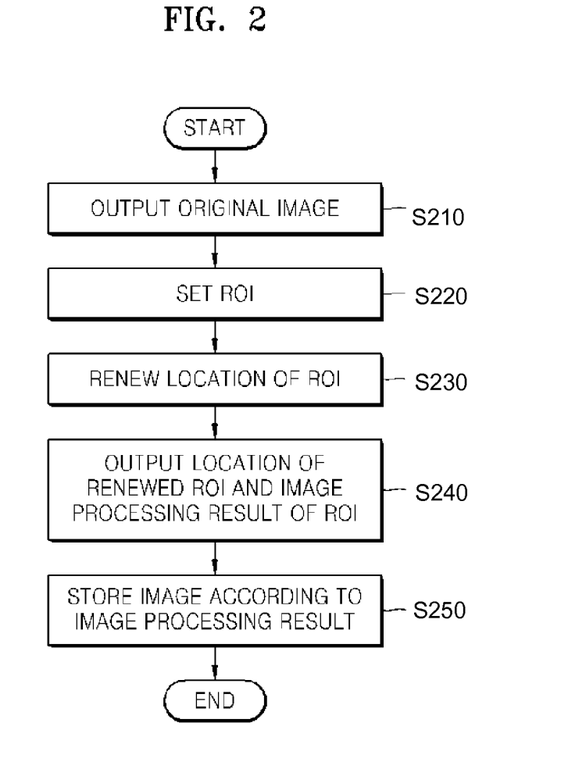
FIG. 2 is a flowchart illustrating a method of processing a user interface of an image processor according to an exemplary embodiment.

FIG. 2 is a flowchart illustrating a method of processing a user interface of an image processor according to an exemplary embodiment.

In operation S210, an original image photographed by a camera or stored in a storage unit 140 by the image processor is displayed on a screen, and an input for the location of an ROI is waited.

In operation S220, at least one ROI on the image displayed on the screen of the image processor is set by a user input, and the location of the set ROI is stored in the storage unit 140.

In operation S230, the location of the ROI is renewed through a location addition and deletion processing of the ROI stored in the storage unit 140.

In operation S240, whenever the location of at least one ROI stored in the storage unit 140 is renewed, the location information of the renewed ROI is outputted on the screen, and image quality improvement processing is performed on the image of the corresponding ROI. Then, the image processing result is displayed on the screen.

In operation S250, according to the image processing result, a new ROI is re-designated, or an image of the ROI is stored.

For example, when the image processing result is unsatisfactory to a user, a new ROI is re-designated. When the image processing result satisfies a user, the image processing result is stored.

Eventually, according to an embodiment, the image processing result of the ROI can be verified in concurrence with an input of the location of the ROI without a cancellation operation using a simple user interface configured with only a location input.

Figure 3:
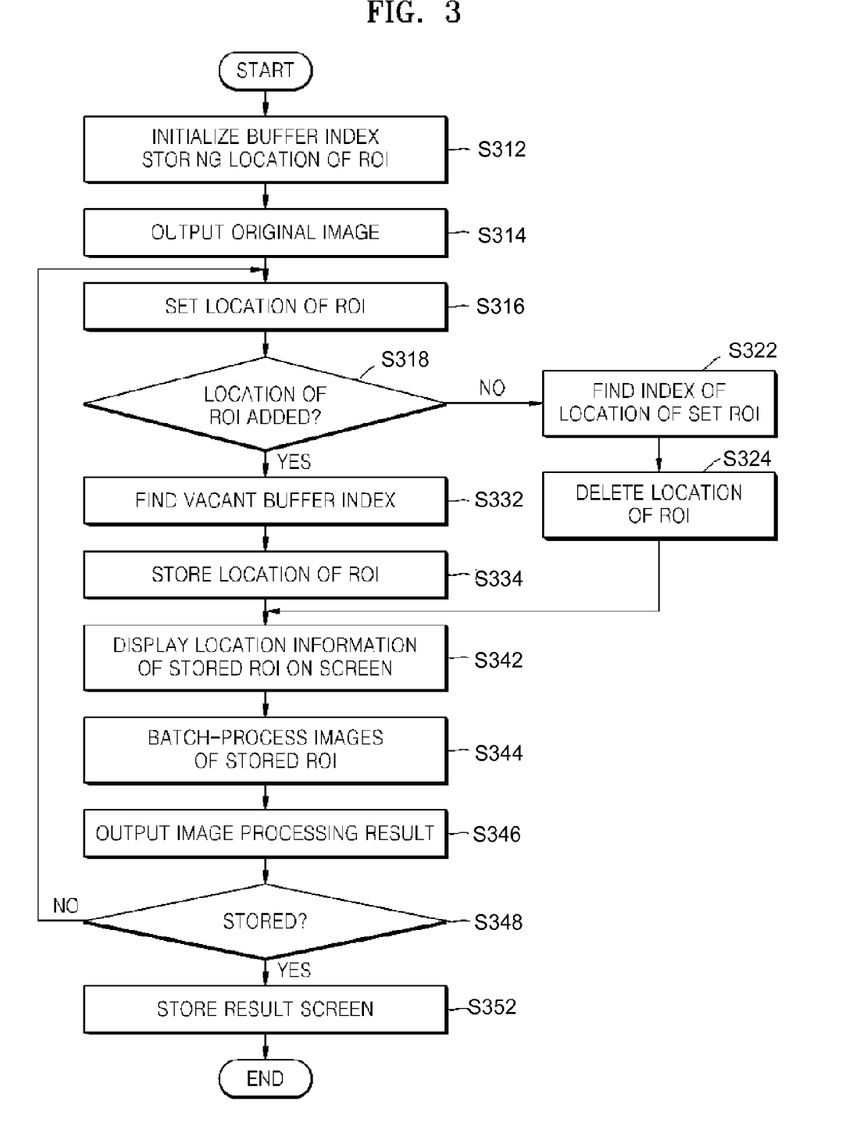
FIG. 3 is a detailed flowchart illustrating a method for processing a user interface in an image processor that supports designation of multiple Regions of Interest (ROIs) according to an exemplary embodiment.

FIG. 3 is a detailed flowchart illustrating a method of processing a user interface in an image processor that supports designation of multiple regions of interest according to an exemplary embodiment.

First, an ROI designation mode for improving the image quality of an ROI is turned on. For example, when the ROI designation mode is turned on, an On Screen Display (OSD) such as "HDR ROI designation mode ON" is displayed on a screen.

In operation S312, a buffer index of a storage unit storing the location of the ROI is initialized.

In operation S314, an original image photographed by a camera or stored by an image processor is displayed on the screen, and an input for the location of the ROI is waited.

In operation S316, the location of a desired ROI is set on the image displayed on the screen by a user's input.

For example, the coordinates of a block unit or a pixel unit inputted on a touch screen by a user are detected for the location of the ROI.

Also, the location of an ROI may be added by a single touch on the touch screen, and the location of the ROI may be deleted by a double touch on the touch screen or an additional single touch on the location of the designated ROI.

In operation S318, it is checked whether the touch on the touch screen is to add or delete the location of the ROI using touch detection corresponding to the location designation on the screen.

In operation S332, when the touch is determined to be a location addition of the ROI by a single touch on the screen, a vacant buffering index of the storage unit is searched, and the location of the ROI is stored in the vacant buffering index in operation S334.

On the other hand, when the touch is determined to be a location deletion of the ROI by a double touch or an additional single touch, a buffering index of the location of the designated ROI is searched in operation S322, and the location of the searched ROI is deleted in operation S324.

In operation 342, whenever the addition or deletion operation of the location of the ROI is performed, the location information of the stored ROI is displayed on the screen in the form of OSD.

That is, whenever the location of the ROI is renewed, the location information of the ROI is stored in the storage unit, and is displayed on the screen in the form of a certain OSD. In this case, the location information of the ROI corresponds to an image processing region having a certain radius around a touch point.

In this case, a buffer array in which the location information of the ROI is to be stored may include various types of buffering such as FIFO, but is not limited thereto.

In operation of S344, image improvement processing is performed in a group for images corresponding to locations of a plurality of ROIs displayed on the screen, using an image quality improvement algorithm such as High Dynamic Range (HDR).

In operation S346, an image processing result based on the location of the ROI displayed on the screen is outputted on the screen.

In operation S348, a determination is made whether the outputted image result on the screen is stored by a user's input (save button).

In this case, when the user saves the outputted image result screen using the save button, the result screen is stored in operation S352. However, when the user does not save the outputting image result screen, a return to the operation S316 in which the location of a new ROI is set.

According to an exemplary embodiment, whenever the location of at least one ROI is renewed in the image processor supporting a plurality of ROIs, the image processing result corresponding to the location of the corresponding ROI may be verified together with the location information of the renewed ROI.

On the other hand, a method of processing a user interface of an image processor designating only one ROI may exclude operations S318, S322, S324, S332 and S334. That is, whenever the location of the ROI is set on the displayed image, the location of the ROI and the image processing result of the ROI are displayed on the screen. Then, the corresponding image is stored, or the location of a new ROI is set according to the image processing result.

FIG. 4A through 4E are diagrams illustrating an example of the designation of a region of interest of FIG. 3

Figure 4A:
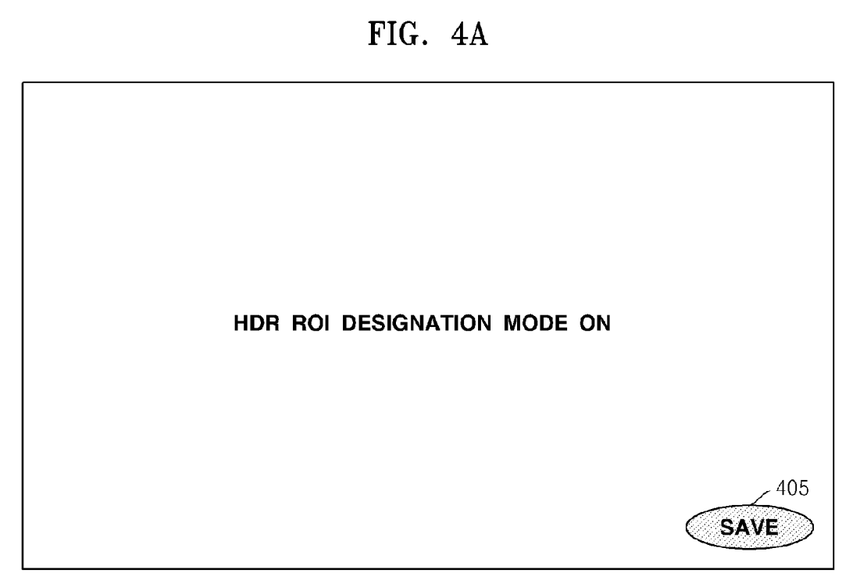
FIG. 4A through 4E are diagrams illustrating an example of the designation of the ROI of FIG. 3.

As shown in FIG. 4A, only the "save" button 405 storing an image processing result may exist on a screen of an image processor.

As shown in FIG. 4A, when an ROI designation mode is turned on, an OSD such as "HDR ROI designation mode ON" is displayed on the screen.

Figure 4B:
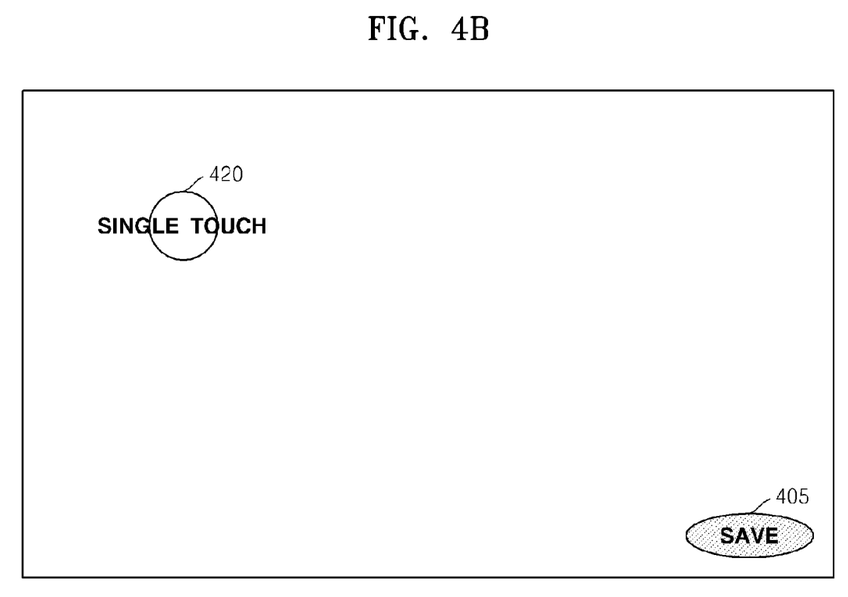
Figure 4C:
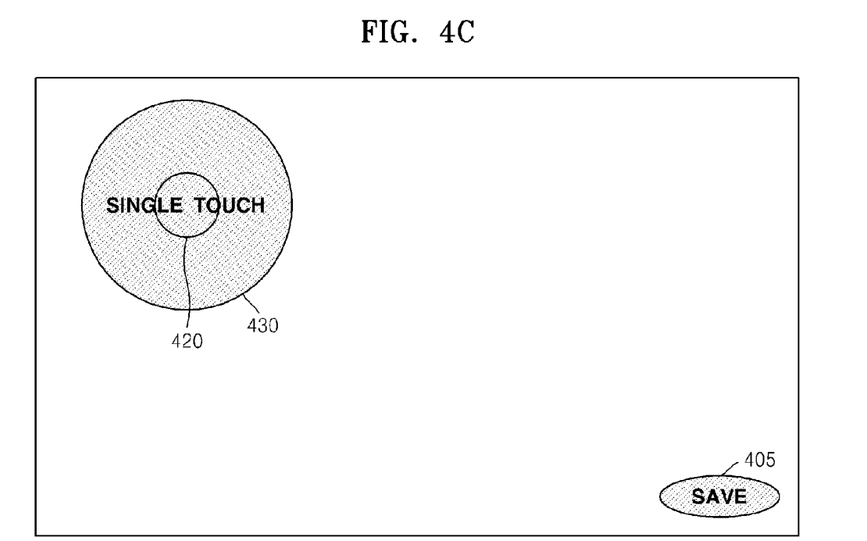

As shown in FIG. 4B, when there is a single touch on a certain point 420, an ROI 430 having a certain radius is displayed around the single touch point 420 as shown in FIG. 4C. Here, the size of the ROI 430 may be set by a user.

Figure 4D:
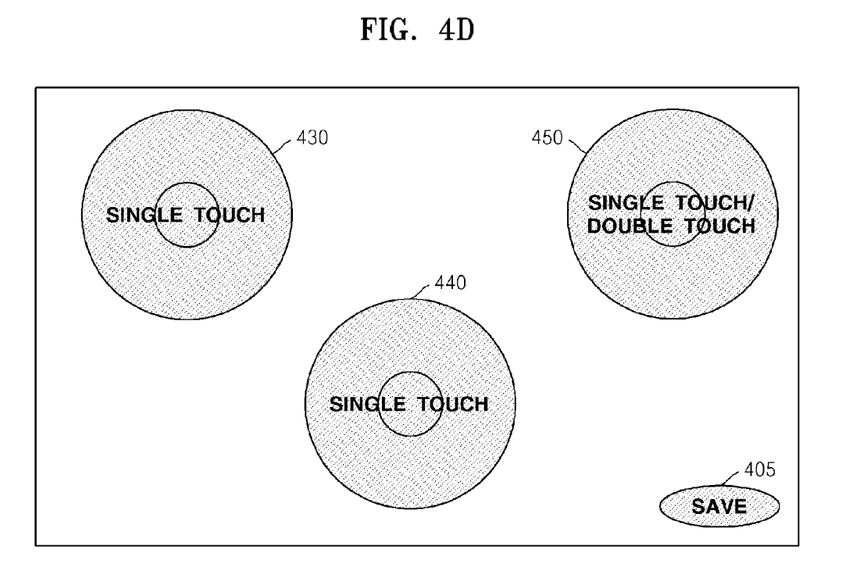

As shown in FIG. 4D, whenever a single touch is performed by a user, ROIs 430, 440 and 450 having certain radii may be displayed around touch points, and images within the designated ROIs 430, 440 and 450 may be displayed on a screen after image quality improvement processing.

Figure 4E:
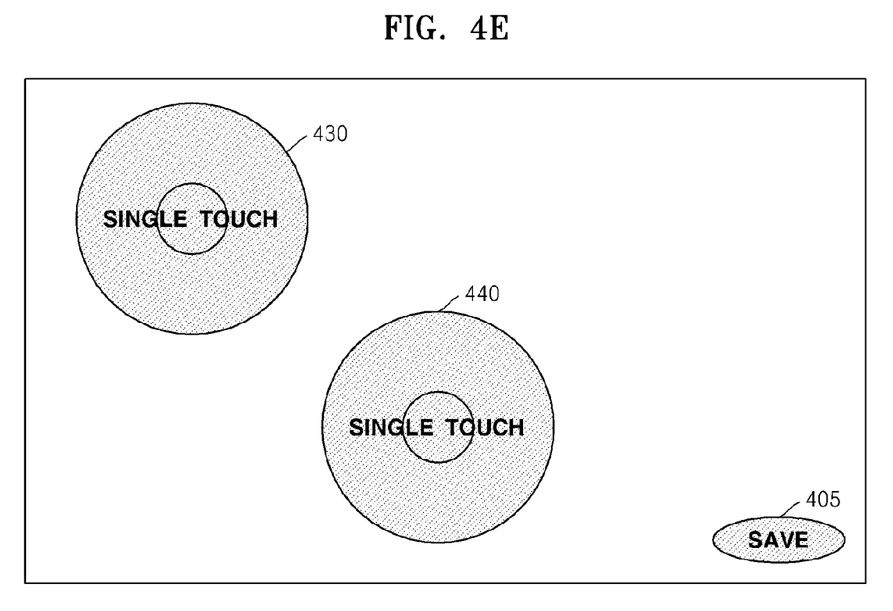

As shown in FIG. 4D, when a double touch is performed on the single touched ROI 450, a corresponding ROI 450 may deleted as shown in FIG. 4E, leaving only two ROIs 430 and 440.

Images of ROIs 430 and 440 finally designated by a user may be stored, or deleted by the "save" button 460.

Accordingly, when an image processing result of the ROI is not satisfactory in a conventional method, there is an inconvenience in that the storage of the processed image has to be cancelled. However, according to the embodiment shown in FIGS. 4A through 4E, addition or deletion of a necessary ROI can be performed only by location designation of an ROI, without a separate cancellation.

Also, as shown in FIGS. 4A through 4E, whenever the location of a new ROI is added, an image result about a newly designated location and stored location can be verified.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the exemplary embodiments have been particularly shown and described with reference to exemplary embodiments thereof, it will be understood by those of ordinary skill in the art that various changes in form and details may be made therein without departing from the spirit and scope of the exemplary embodiments as defined by the following claims.

What is claimed is:

1. A method of processing a user interface of an image processor, comprising:
   setting, by a processor, at least one Region of Interest (ROI) on an image displayed on a screen by a single touch on a certain point on the screen and displaying the at least one ROI around the single touch point;
   outputting location information of a renewed ROI and an image processing result for a location of the renewed ROI whenever the location of the at least one ROI is renewed; and
   storing the image of the at least one ROI or re-designating a new ROI without storing the image of the at least one ROI according to the result of the image processing,
   wherein the storing of the image of the ROI comprises storing images when a command for storing the images of the ROI displayed on the screen is received and designating a new ROI when the command for storing the images of the ROI displayed on the screen is not received.

2. The method of claim 1, wherein the renewal of the at least one ROI comprises adding a location of an ROI by a single touch on a screen and deleting the location of the ROI by performing either a double touch or an additional single touch for the location of the designated ROI on the screen.

3. The method of claim 1, wherein the outputting of the location information of the at least one ROI comprises storing a location of an ROI whenever the location of the ROI is added or deleted and displaying the location of the ROI on the screen in the form of a certain image whenever the location of the stored ROI is renewed.

4. The method of claim 3, wherein the location of the ROI is an image processing region having a certain radius around a touch point of the user interface of the image processor.

5. The method of claim 1, wherein the location of the at least one ROI is stored in a First In First Out (FIFO) buffer array.

6. The method of claim 1, wherein the outputting of the image processing result comprises performing image quality improvement processing on images of the at least one renewed ROI in a group to display the image quality-improved images on the screen.

7. A method of processing a user interface in an image processor, the method comprising:
   displaying an original image on a screen;

setting, by a processor, an ROI on the original image displayed on the screen by a single touch on a certain point on the screen;

displaying the ROI around the single touch point and an image of an image processing result whenever the location of the ROI is set on the displayed image; and storing the image or re-designating a new ROI without storing the image of the ROI according to the image processing result, wherein the storing of the image comprises storing images when a command for storing the image quality improved images displayed on the screen is received and setting anew image of the ROI when the command for storing the image quality improved images displayed on the screen is not received.

8. The method of claim 7, wherein the location of the ROI is stored in a FIFO buffer array.

9. The method of claim 7, wherein the displaying of the location of the ROI and the image processing result comprises displaying an On Screen Display (OSD) information corresponding to the location of the ROI and performing image quality improvement processing for the image of the location of the ROI to display the image on the screen.

10. A user interface processor of an image processing system comprising:

a control unit which extracts location information of an ROI when the ROI is set on an image displayed on a screen by a single touch on a certain point on the screen and displays the ROI around the single touch point, and displays location information of a renewed ROI and an image for a location of the renewed ROI whenever the location information of the ROI is renewed; and an image signal processing unit which converts the location information of the ROI extracted from the control unit into graphic data and performing image signal processing on the image of the ROI, wherein the control unit stores the image or re-designates a new ROI without storing the image of the ROI according to the image processing result, wherein the control unit stores images when a command for storing the image quality improved images displayed on the screen is received and sets a new image of the ROI when the command for storing the image quality improved images displayed on the screen is not received.

11. The user interface processor of claim 10, further comprising a FIFO buffer array storing the location of the ROI.

12. A non-transitory computer readable recording medium storing a program for executing a method of processing a user interface in an image processor, wherein the program, when executed on a computer, causes the computer to execute the process comprising the steps set forth in claim 1.

* * * * *